May 8, 1951 E. H. REPLOGLE 2,552,115
AIRCRAFT ALIGHTING GEAR
Filed Sept. 21, 1949
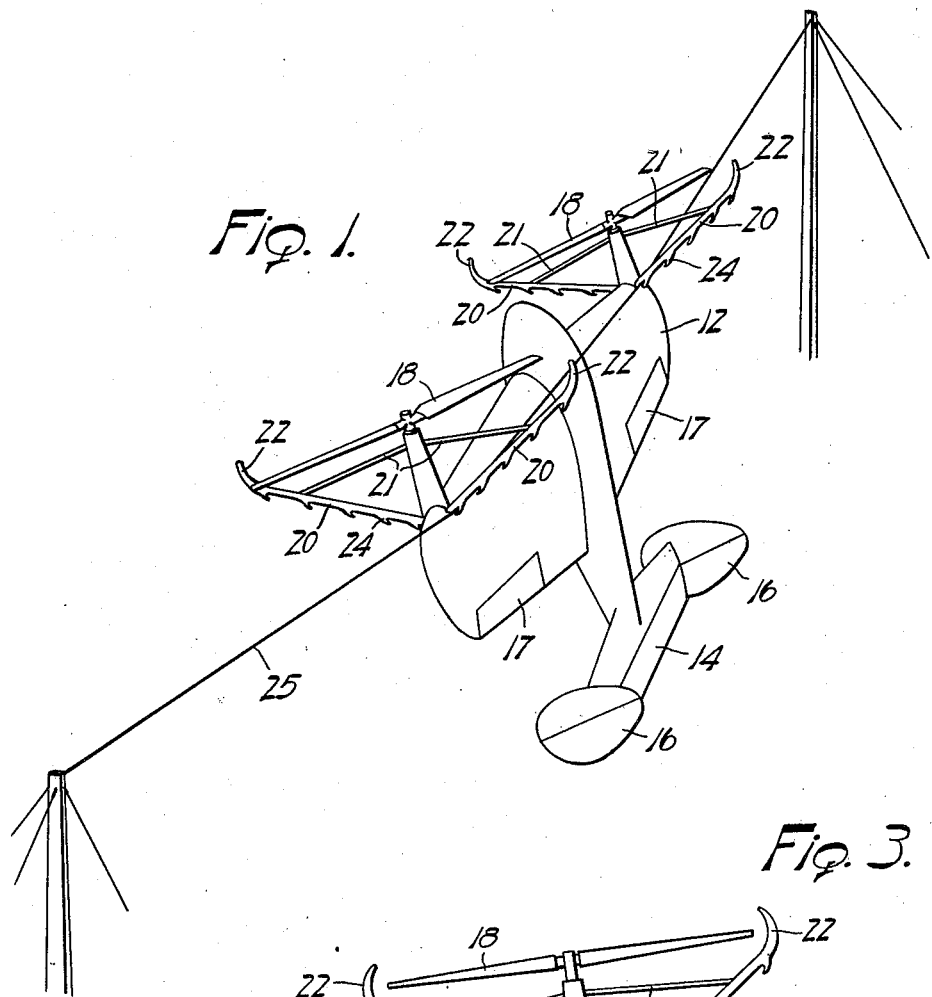
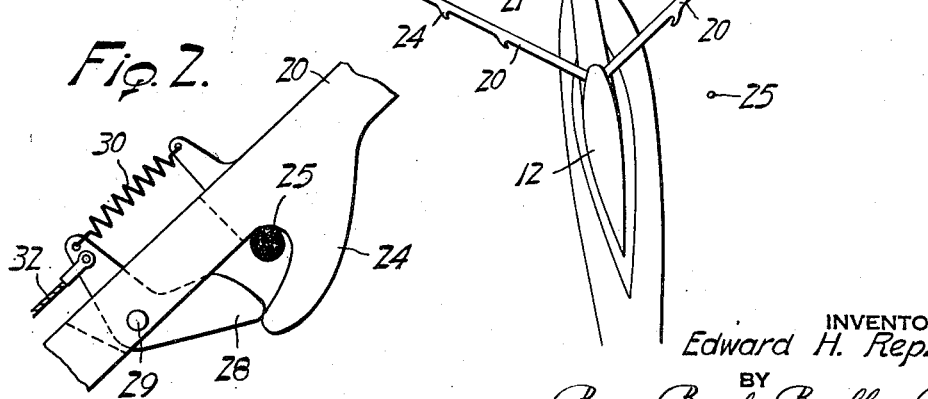
INVENTOR
Edward H. Replogle
BY
Bean, Brooks, Buckley & Bean
ATTORNEYS Patented May 8, 1951

2,552,115

UNITED STATES PATENT OFFICE 2,552,115

AIRCRAFT ALIGHTING GEAR

Edward H. Replogle, Tonawanda, N. Y., assignor to Stanley Aviation Corporation, Buffalo, N. Y.

Application September 21, 1949, Serial No. 116,893

10 Claims. (Cl. 244—100)

This invention relates to aircraft of the vertically flyable and hovering type, and more particularly to an improved landing and take-off technique and anchorage means therefor.

One of the objects of the invention is to provide in an aircraft of the type which is capable of relatively slow vertical flight or hovering maneuvers, an improved form of alighting or anchorage gear enabling such aircraft to be "hung" for example upon any conveniently available horizontally extending beam or bar, or upon a rope or cable stretched between posts or the like so as to extend horizontally above the adjacent ground or platform elevation.

Another object of the invention is to provide an improved landing or anchorage gear system for aircraft of the type referred to hereinabove, which eliminates need for the usual flat type landing surface.

Another object of the invention is to provide an improved landing and take-off system for aircraft of the type referred to hereinabove whereby an absolute minimum of room is required to permit the landing aircraft to settle into its anchorage on a ground or carrier vessel station, and to take off therefrom.

Another object of the invention is to provide in an airscrew propelled convertible type aircraft an improved vertical descent type landing gear arrangement which also functions in a novel and improved manner to provide an emergency landing gear and airscrew guard device in event of a landing without assistance of a landing beam or cable as referred to hereinabove.

Other objects and advantages of the invention will appear from the specification hereinafter.

In the drawings:

Fig. 1 is a perspective view of an aircraft of the convertible type embodying an alighting arrangement of the invention, and illustrating said aircraft in a normal "grounded" or "hung" position upon an anchorage means of the invention;

Fig. 2 is a fragmentary illustration of a hook latch device such as may be used in conjunction with the invention; and Fig. 3 is a fragmentary side elevation of the aircraft of Fig. 1, illustrated as being engaged in a landing or take-off maneuver relative to an anchorage means.

The invention contemplates generally the provision of a novel alighting gear device, and when used in conjunction with a hovering type aircraft having one or more airscrews the alighting gear may comprise one or more beams arranged to extend from the aircraft and to have a hook or hooks at the rear side thereof so that when the aircraft is in a descending maneuver from a hovering condition with the thrust axis directed upwardly the beam device will settle into contact with and grapple upon any horizontally extending support device such as a bar or cable drawn between two posts, or the like while preventing contact between such beam or cable and the airscrews. Thus, the aircraft may be "hung" upon the landing station support in substantially the same attitude assumed during take-off and landing maneuvers; and thus it will be appreciated that the only landing station mechanism required to be provided is in the form of a horizontally extending bar or cable or the like.

More specifically, as illustrated in the drawing, the invention is particularly suited for example to application to a so-called convertible type aircraft; that is, an aircraft of the type having a wing 12; pitch and ruddering controls such as surfaces 14—16 respectively; roll controls such as surfaces 17—17; and propulsive devices such as airscrews 18—18 arranged to lift the aircraft vertically as in the manner of a helicopter and/or to pull the aircraft horizontally as in the manner of conventional aircraft flight.

The alighting gear structure of the invention is for example illustrated in the drawing to comprise paired beams 20 which are rooted upon the aircraft structure and arranged to extend therefrom radially of the airscrews of the aircraft and behind the planes of rotation thereof; the beam members 20 being disposed to extend in planes substantially normal to the general plane of the main wing 12 of the aircraft. The beam members 20 may be braced relative to the aircraft as by means of members 21, and preferably terminate in turned end portions 22 encircling the edge view profile of the corresponding airscrew tip path, as more clearly shown in Fig. 3. At their rear edges the beams 20 are formed with hook devices 24 at intervals therealong.

Thus, it will be appreciated that for landing and take-off purposes the aircraft illustrated by the drawing may employ any conveniently available horizontal bar or taut cable structure as indicated at 25, and that the bar or cable structure may be easily erected at any ground station or on the deck of a carrier vessel or other moving vehicle, as may be required. In any case there is no need for provision of the usual flat landing surface required to accommodate landing and take-off maneuvers as in prior type aircraft. To effect a landing maneuver the aircraft is simply permitted to settle slowly downwardly from a hovering position above the anchorage device 25 until such time as the beam members 20 at either side of the aircraft contact the anchorage device, whereupon the hook portions of the beam members will engage upon the anchorage device so as to assume vertical support of the aircraft. The engines may then be stopped, and the aircraft left in vertically hanging attitude until such time as its services are again required. For take-off the engine and airscrew blade control devices are manipulated so as to cause the aircraft to rise vertically away from the anchorage device in the manner of a helicopter take-off.

The gear arrangement of the invention provides also an emergency landing feature in that the beam devices 20 extend so as to be adapted to function as landing skids in event of an emergency landing upon a horizontal surface without benefit of the horizontal bar or cable suspension device referred to hereinabove. In such case the beam members protect the airscrews from contact with the ground surface, thereby minimizing damage to the aircraft even under such emergency landing conditions.

As illustrated by Fig. 2, a latch device may be installed in conjunction with each of the hook elements so as to insure retention of the aircraft upon the suspension means whenever contact is made. Thus, the latch devices may be of any desired form and as shown in the drawing for example may each comprise a bell crank 28 pivoted as at 29 to the beam 20 and biased by means of a spring 30 toward closed position. The latches of each hook device of each beam may be operably interconnected as by means of a manually pulled cable 32 for latch release purposes during take-off.

Although only one form of the invention has been shown and described in detail it will be apparent to those skilled in the art that the invention is not so limited but that various changes may be made therein without departing from the spirit of the invention or the scope of the appended claims.

What is claimed is:

1. In an aircraft of the type intended for slow vertical take-offs and landings with the thrust axis thereof in a substantially vertical attitude, said aircraft including a wing and airscrew means, an alighting gear for said aircraft comprising beam devices extending from said wing in directions generally normal to the plane of said wing and at positions behind said airscrew means so as to extend generally diametrically thereof and terminating in curved end portions substantially encircling the edge view profile of said airscrew tip paths, said beam devices being formed with hook elements extending rearwardly therefrom for engagement with horizontally disposed anchorage means whenever said aircraft lowers with its airscrew thrust axis disposed vertically into a position of contact between said beam hook devices and the anchorage means.

2. In an aircraft of the type intended for slow vertical take-offs and landings, said aircraft comprising a frame and airscrew means carried by said frame, alighting gear means for said aircraft comprising beam devices extending from said frame at positions behind said airscrew means so as to extend generally radially thereof and terminating in curved end portions substantially encircling the edge view profile of said airscrew tip paths, said beam devices being formed with hook elements extending rearwardly therefrom for engagement with horizontally disposed anchorage means whenever said aircraft is lowered into a position of contact between said beam hook devices and the anchorage means.

3. In an aircraft of the type intended for slow vertical take-offs and landings, said aircraft comprising a frame and an airscrew carried by said frame, alighting gear means for said aircraft comprising a beam device extending from said frame at a position behind said airscrew so as to extend generally radially thereof, said beam device being formed with hook elements extending rearwardly therefrom for engagement with horizontally disposed anchorage means whenever said aircraft is lowered into a position of contact between said beam hook devices and the anchorage means.

4. In an aircraft of the type intended for slow vertical take-offs and landings, said aircraft comprising a frame and an airscrew carried by said frame, alighting gear means for said aircraft comprising a beam device extending from said frame at a position behind said airscrew so as to extend generally radially thereof and terminating in a curved end portion substantially encircling the edge view profile of said airscrew tip path, whereby said beam device may engage with a horizontally disposed anchorage means whenever said aircraft is lowered into a position of contact between said beam device and the anchorage means.

5. In an aircraft of the type intended for slow vertical take-offs and landings with the thrust axis thereof in a substantially vertical attitude, said aircraft including a wing, an alighting gear means for said aircraft comprising a beam device extending from said wing in directions generally normal to the plane thereof, said beam device being formed with a hook element extending rearwardly therefrom for engagement with horizontally disposed anchorage means whenever said aircraft lowers with its thrust axis disposed upwardly into a position of contact between said beam hook device and the anchorage means.

6. In an aircraft of the type intended for slow vertical take-offs and landings with the thrust axis thereof in a substantially vertical attitude, an alighting gear means for said aircraft comprising a hook device extending from said aircraft for engagement with horizontally disposed anchorage means whenever said aircraft lowers with its thrust axis disposed upwardly into a position of contact between said hook device and the anchorage means.

7. In an aircraft of the type intended for slow vertical take-offs and landings with the thrust axis thereof in a substantially vertical attitude, said aircraft including a wing, an alighting gear means for said aircraft comprising a beam device extending from said wing in directions generally normal to the plane thereof, said beam device being formed with an automatically latching hook element extending rearwardly therefrom for engagement with horizontally disposed anchorage means whenever said aircraft lowers with its thrust axis disposed upwardly into a position of contact between said beam hook device and the anchorage means.

8. In an aircraft of the type intended for slow vertical take-offs and landings with the thrust axis thereof in a substantially vertical attitude, an alighting gear means for said aircraft comprising an automatically latching hook device extending from said aircraft for engagement with horizontally disposed anchorage means whenever said aircraft lowers with its thrust axis disposed upwardly into a position of contact between said hook device and the anchorage means.

9. In an aircraft of the type intended for slow vertical take-offs and landings with the thrust axis thereof in a substantially vertical attitude, said aircraft including a wing and airscrew means, an alighting gear for said aircraft comprising beam devices extending from said wing in directions generally normal to the plane of said wing and at positions behind said airscrew means so as to extend generally diametrically thereof and terminating in curved end portions substantially encircling the edge view profile of said airscrew tip paths, said beam devices being formed with automatically latching hook elements extending rearwardly therefrom for engagement with horizontally disposed anchorage means whenever said aircraft lowers with its thrust axis disposed vertically into a position of contact between said beam hook devices and the anchorage means.

10. In an aircraft of the type intended for slow vertical take-offs and landings, said aircraft comprising a frame and airscrew means carried by said frame, alighting gear means for said aircraft comprising beam devices extending from said frame at positions behind said airscrew devices so as to extend generally radially thereof and terminating in curved end portions substantially encircling the edge view profile of said airscrew tip paths, said beam devices being formed with automatically latching hook elements extending rearwardly therefrom for engagement with horizontally disposed anchorage means whenever said aircraft is lowered into a position of contact between said beam hook devices and the anchorage means.

EDWARD H. REPLOGLE.

REFERENCES CITED

The following references are of record in the file of this patent:

UNITED STATES PATENTS

| Number | Name | Date |
|---|---|---|
| 965,881 | Draper | Aug. 2, 1910 |
| 1,509,962 | Lorenz | Sept. 30, 1924 |
| 1,624,188 | Simon | Apr. 12, 1927 |
| 1,655,113 | Tesla | Jan. 3, 1928 |
| 1,869,506 | Richardson | Aug. 2, 1932 |